Patented July 11, 1933

1,917,680

UNITED STATES PATENT OFFICE

DIETRICH WITT, OF KARLSHORST, GERMANY

PROCESS FOR THE MANUFACTURE OF A CARBON DIOXIDE MANURE

No Drawing. Application filed July 13, 1931, Serial No. 550,626, and in Germany July 14, 1930.

In recent times the opinion has been confirmed over and over again that for the development of plants the content of carbon dioxide in the air is of great importance. It has, for instance, been found that by regularly treating a test field with carbon dioxide the growth of the plants is considerably advanced as compared with that of similar plants not so treated. Moreover, it has been shown that the favourable effect of the carbon dioxide is also obtained if the test plants are manured with material which gives off carbon dioxide in small quantities, such as animal manures and biologically prepared turf.

For the preparation of carbon dioxide manure other substances containing carbon are readily accessible, such as peat and pit-coal. In the French Patent No. 555,901 a process is described in which a manure containing carbon is produced wherein coal and carbonized material, or even material not wholly carbonized, is mixed with oxidizers or agents for catalysis. The carbonization here takes place through the influence of anhydrous sulphuric acid on shavings, turf and the like. In this connection particular emphasis is laid upon the fact that the finest grinding of the carbon extracted is essential. As oxidizers, i. e. agents for catalysis, sodium nitrate, manganese oxide and other suitable nitrates are added. As agents for catalysis, copper compounds are also proposed. Moreover, compounds containing ammonia also are added.

In the British Patent 318,404 a process is described for the manufacture of a manure in which finely ground pit-coal mixed with wood or vegetable or animal material, or turf, bones and the like, is further mixed with lime, oxide of calcium, and common salt or sea salt, and is treated with steam under pressure, whereby the extracted hydrocarbons are simultaneously obtained.

Whereas, according to the processes hereinbefore described, pit-coal in particular and other raw materials come into service as a carbon base for the manure, in the process now to be described use is made of a technical product obtained from quite another source, namely, extract residues from peat obtained by the dry distillation of lignite or brown coal, i. e., coke of brown coal which is analogous to the coke of black or stone coal except that coke of brown coal is not hard and brittle but is soft and porous and consists of a fine amorphous and porous grey-colored mass. Research shows that with bituminous brown coal or peat, carbon dioxide is only given off very slowly. Better results are obtained from the use of brown coal or peat which is poor in bitumen, and also from turf. However, in all cases the conversion to carbon dioxide only proceeds very slowly. Biologically prepared coals or turf certainly led to more favourable results, but the process is too elaborate and, therefore, not of practical value.

Close investigations have now yielded the surprising result that the oxidation of the material containing carbon can also be carried out in a damp state and in a sufficiently quick manner if extract residues of peat are used. Successful results are, for instance, obtained by converting coke of brown coal, or lignite in the damp state slowly and uniformly into carbon dioxide with the help of catalytic agents which carry oxygen. As catalytic agents oxides of Fe, Cr, Mn, Cu, Ni, Co, Th, Zr, Si, Al, either alone or mixed together, and possibly with the addition of alkali can be used. Use of the catalytic agent is made to such a small extent that it can have no damaging effect on the plants. It should particularly be observed in this connection that a fine grinding of the coke of brown coal or lignite is not necessary, for in such coke a material is present which, both in its external nature, as also in its chemical and physical composition, is in principle different from the materials hitherto used, and which excels other coal and carbon products through its essentially greater power of reaction, which is, in fact, so pronounced that even when the catalytic agent is thoroughly dampened this does not impair the oxidation or formation of carbon dioxide. This property, which is distinctive as compared with pit coal and its carbon products, is to be attributed to the binding of the oxygen to the coke of brown coal or lignite which is particularly favourable to the purposes now in view, which binding easily leads to the separation of carbon dioxide with the use of suitable catalytic agents, and thus opens up fresh surfaces of attack for new oxygen in the coke. The manure obtained by catalysis from coke of brown coal or lignite thus signifies an essential advance in relation to carbon dioxide manures produced from soot and pit coal.

For instance, a valuable carbon dioxide manure can be obtained if the glowing coke of brown coal or lignite, in the form of hot ashes or extract coke, as it comes straight from the extracting station, is slaked in quenching water to which the catalytic agents already mentioned are added in solution, i. e. in the form of a sulphate or nitrate. On the other hand, the activities of the coke of brown coal may first be brought into operation only at the place where they are used by moistening the coke or lignite immediately prior to use with a solution containing the catalytic agent.

The addition of the catalytic agent can, of course, also be made in a dry state in the form of powder (most suitably in a compound soluble in water) to the dry extract residues of peat. In this case, a disintegration of the salts containing the catalytic agent sets in when the manure is spread owing to the dampness of the soil, and the catalytic agent precipitates on the material containing carbon and increases its power of oxidation.

With the employment of the above-described carbon manure the most favourable results will only be obtained if suitable quantities of phosphorous, potash and nitrogen are simultaneously added. It is, therefore, of advantage in many cases to mix the carbon residues with manure containing suitable quantities of phosphorus, potash and nitrogen. The catalytic additions to the carbon dioxide manure can then be added according to requirements at the place where the manure is produced, or only on its being distributed, or shortly before the distribution. There is no unfavourable effect on the carbon manure as a result of the organic manure added thereto. The great advantage of the use of mixed manure which gives off carbon dioxide in small quantities, and which contains phosphorous, potash and nitrogen, consists in the fact that the plants receive simultaneously, and in adequate quantities, all growth-promoting substances, so that a beneficial result is ensured.

Having now described my invention, what I claim and desire to secure by Letters Patent is:—

1. An artificial manure which will give off carbon dioxide consisting of coke of brown coal and a catalytic agent which will accelerate oxidation.

2. An artificial manure which will give off carbon dioxide consisting of coke of brown coal and a catalytic agent consisting of an oxide of one or more metals which will accelerate oxidation.

3. An artificial manure which will give off carbon dioxide consisting of the amorphous porous coke of brown coal and a catalytic agent consisting of an oxide of one or more metals which will accelerate oxidation, the agent being insufficient in quantity to affect the fertilized plants.

4. An artificial manure which will give off carbon dioxide consisting of coke of brown coal, and a catalytic agent which will accelerate oxidation, and organic manure containing phosphorus, potash, and nitrogen.

5. In a manure as set forth in claim 4, the addition of an alkali.

6. An artificial manure which will give off carbon dioxide consisting of coke of brown coal, and a catalytic agent consisting of an oxide of one or more metals which will accelerate oxidation, an alkali, and organic manure.

7. Process of making an artificial manure which will give off carbon dioxide, consisting in dry distilling coke of brown coal to a fine amorphous and porous mass, and slaking the coke while still hot in water containing a catalytic agent which will accelerate oxidation.

8. Process of making an artificial manure which will give off carbon dioxide, consisting in dry distilling coke of brown coal to a fine amorphous and porous mass, and moistening the coke immediately before us as a manure with water containing a catalytic agent which will accelerate oxidation.

9. Process of making an artificial manure which will give off carbon dioxide, consisting in dry distilling coke of brown coal to a fine amorphous and porous mass, and adding a catalytic agent in the dry state in the form of a powder soluble in water to the dry coke, the dampness of the soil causing the agent to react after the manure is spread.

10. Process of making an artificial manure which will give off carbon dioxide, consisting in dry distilling coke of brown coal to a fine amorphous and porous mass; moistening the coke in water containing catalytic agent which will accelerate oxidation; and adding an organic manure.

In testimony whereof I affix my signature.

DIETRICH WITT.